United States Patent Office 3,101,247
Patented Aug. 20, 1963

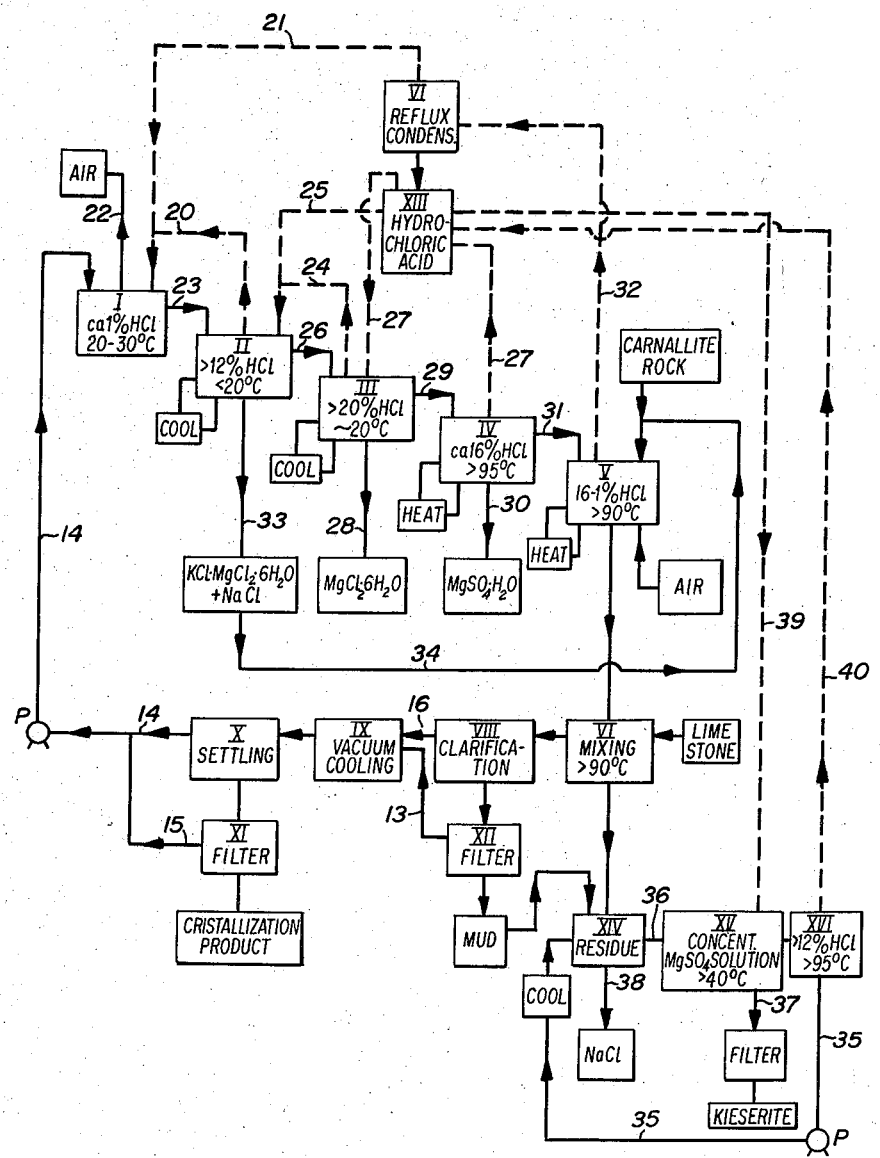

3,101,247
PROCESS FOR TREATING CARNALLITE
BEARING MATERIALS
Fritz Serowy, Berlin-Friedrichshagen, Germany, assignor to Deutsche Akademie der Wissenschaften zu Berlin, Berlin-Adlershof, Germany
Filed June 11, 1959, Ser. No. 819,630
Claims priority, application Germany June 13, 1958
4 Claims. (Cl. 23—39)

This invention relates to a process for the treatment of magnesium- (and calcium-), sodium- and potassium-chloride and -sulfate bearing materials, e.g. carnallite and kieserite, for the purpose of recovering potassium chloride and other products.

Among the products obtained in the treatment of carnallitic mineral salts in accordance with the present invention are bischofite, a natural hydrated magnesium chloride ($MgCl_2.6H_2O$), and kieserite, a hydrated magnesium sulfate ($MgSO_4.H_2O$), as well as potassium chloride, KCl and NaCl.

A number of methods with variations thereof are known for the treatment of magnesium- (and calcium-) chloride and sulfate bearing potash mineral salts of oceanic origin and particularly those having a high carnallite content. Some have been carried into effect on a large scale with the economic efficiency expected, and some have been given up again. In all treatment methods hitherto adopted considerable amounts of liquors containing $MgCl_2$, KCl, NaCl, $MgSO_4$ were obtained. These were drained into rivers or sunk into mountain gorges resulting in appreciable losses of potassium chloride and magnesium sulfate. At the same time no recovery of bischofite, a substance becoming more and more valuable for the future, or of substantial amounts of the still valuable kieserite, was effected. The discharge of the final liquors into the rivers, moreover, resulted in heavy salting of the rivers from which, with the steadily increasing production of waste liquors, great damage to the national economy must be feared. Also the discharging of the final liquors into the mountain gorges involves uncertainties as to the geological-morphological effects that it may have.

In a fractional evaporation of such liquors, as it is now only sporadically carried out, which liquors include also the potash-magnesia liquors enriched with carnallite in magnesium chloride, there was separated at first a larger or smaller portion of the dissolved secondary salts, i.e., rock salt, carnallite and often kieserite or sulfate double salts. In part, this mixture could be returned to the primary carnallite treatment process; in part, it had to be removed with the residue. In the most favorable case there resulted a magnesium chloride solution of relatively low alkali content, a so-called final liquor. To obtain the bischofite in pure state, it was necessary first to remove the residual magnesium sulfate from the liquor by addition of calcium salts and then evaporate the liquor at elevated temperatures. This has hitherto been done as in "salt-working" in pans by raising the temperature to about 160° C. The attempt has also been made to obtain crystallized bischofite or tetrahydrate ($MgCl_2.4H_2O$) by vacuum evaporation at somewhat lower temperatures, maximum 140° C., with recovery of heat energy. In both cases, therefore, a considerable amount of heat was required which could be supplied in the temperature ranges referred to only with the use of relatively highly compressed steam.

In view of the steadily increasing amounts of carnallite mineral salts (carnallite rock and sylvinite) to be treated, in particular the mixed crude salts, the expensive evaporation was for this reason largely dispensed with. Thus there resulted the crucial problem of final liquor disposal, the solution of which was proposed by building a canal to the sea. This meant giving up the recovery of those amounts of potassium chloride and kieserite which were determined by the equilibrium conditions in the solution. The yields of potassium chloride depending upon the magnesium chloride content of the final liquors decreased considerably and were much below the yields obtained by other processes, i.e., sylvinite, and hard salt process. Lastly, also appreciable amounts of $MgSO_4$ were lost with the liquors.

It is an object of the present invention to provide a process for the treatment of magnesium- (and calcium-) sodium- and potassium-chloride and sulfate bearing materials for the purpose of recovering KCl and other products therefrom without the development of a liquor that must be discarded.

It is also an object of the present invention to provide a continuous process for the treatment of a carnallite and kieserite bearing material for the purpose of recovering KCl, bischofite, kieserite without the development of a liquor that must be disposed of.

Other and more detailed objects will be apparent from the following description, claims and drawing wherein the FIGURE is a diagrammatic representation of a process embodied in the present invention.

It has now been found that in the treatment of carnallite and kieserite containing mineral salts the final liquor problem can be solved radically and the potash and magnesium sulfate losses can be reduced considerably, i.e. limited to the inevitable losses in the solution residue and mud containing finely divided salt. Instead of the hitherto commonly used cold or hot decomposition solution for "hot washing" or the dissolving liquor for "complete solution" of the carnallite and variations thereof, in accordance with the present invention one uses as solvent a residual solution having steadily decreasing hydrogen chloride content to a practical absence of HCl. This is obtained in a salting-out process of the mother liquor obtained in the crystallization of the potash product obtained as KCl poor in NaCl after having removed from the solution by vacuum cooling the residue consisting mainly of rock salt and kieserite and of the fine salt-containing mud of about the same composition by means of hydrogen chloride. By subsequent salting-out the following salts are precipitated from this mother liquor in a sequence determined by their solubility: First carnallite and NaCl, then bischofite, and thereafter kieserite; after HCl has been driven off, the above named final solution will result as a solvent for carnallite. In this way it is possible practically to equalize the water economy of the process so that all discarding of liquor is avoided and a process equivalent to the "sylvinite and hard salt treatment" processes with the same high yields is insured.

It has further been found that in the said salting-out process it is possible to separate magnesium sulfate dissolved in the mother liquors in the same manner in which the known separation of the alkali chlorides from the alkaline earth chlorides is done. According to this invention, the magnesium sulfate separates as reactive kieserite at a solubility rate determined by the process. It was not predictable that the temperature and concentration conditions used in the separation of the alkali and alkaline-earth chlorides processes would also be favorable for the proposed over-all process since the $MgSO_4$—HCl—$H_2O$ system the effect of temperature and concentration is known to be specific. As was found, there occurs in the bischofite salting-out step, upon attainment of the saturation limit for magnesium sulfate at temperatures below 30° C., a conversion which takes place according to the following equation:

$$MgSO_4 + 2HCl = MgCl_2 + H_2SO_4$$

bischofite being additionally deposited. The resulting sulfuric acid reacts in a subsequent hydrogen chloride expulsion step of the process at temperatures above 40° C., notably above 90° C., with $MgCl_2$ still present, again forming $MgSO_4$. Upon attainment of the saturation limit it is deposited exclusively as a reactive kieserite depending on the inconstant equilibrium of the continuously forming solution. With this satisfactory separation of the chlorides from the sulfates, the above-mentioned prior art process step of precipitation of the magnesium sulfate by means of calcium salts and the removal of the resulting calcium sulfate becomes unnecessary.

All partial processes within the principal process proceed at predetermined temperatures in the range between 0° and 100° C. Hence, in the expulsion of the hydrogen chloride more highly compressed steam is not required, but cheap waste steam suffices which, for example, may come from the power generation for operation of the entire plant. In addition, there is needed in the cycle besides the heat for heating the solution, only heat of evaporation for the hydrogen chloride used and minor amounts of water according to the partial pressure above the solution. In contrast, in the usual evaporation processes of the prior art the entire water of the mother liquor excepting the hydrate water of the bischofite would have to be evaporated for recovery of the solid salts. There is, calculated for the HCl evaporation and a little water as compared with that of the total water, a calorie saving of at least 35% and of course accordingly less when heat recovery takes place in the latter case.

The expulsion of the hydrogen chloride following the salting-out of the bischofite is effected by a known process.

The resulting rock salt and more or less kieserite bearing residue including mud from the dissolving step of the carnallite and kieserite bearing mineral salt can be likewise processed in a side process with hydrochloric acid of about 12% HCl and more to form a reactive magnesium sulfate hydrate. It can, in fact, be dissolved out of the residues including mud by means of hydrochloric acid without attack of the rock salt and appreciable double salt formation and be salted out as kieserite at temperatures above 40° C. after further addition of hydrogen chloride. At temperatures below 30° C., when the saturation limit is reached, sulfuric acid is formed with separation of bischofite, as mentioned above. The recovery of the entire kieserite from the crude salt would thus be possible in combination with the salting-out process of the mother liquor from the crystallization of potassium chloride or without the same. Moreover, at the same time the wash liquor problem is radically solved.

As a precaution, the resulting mother liquors of the carnallite dissolving process may be debrominated before being salted out, as hydrogen chloride liberates elementary bromine in small amounts from the bromide salts through a photochemical reaction.

The importance of the total process resides in the possibility of treating carnallitic and kieserite mineral salts of oceanic origin without any final liquor discarding (mother liquor as well as waste liquor), in a substantial increase of the potassium chloride yield up to 93% and more (to about 100%), and in an improvement of the quality of the special products bischofite as chemical component of carnallite and kieserite obtained by selective separation and representing valuable basic materials of the potash industry.

The rock salt and insoluble impurities from the residues (including mud) stay behind and may be used as mixing material in the mine or for preparing the brine for the salt recovery.

In the accompanying drawing the process of the invention is represented in principle. The process of the invention can be combined and employed with other processes or parts thereof under observance of the principle set forth.

The following examples are further illustrative of the present invention and it will be understood that the invention is not limited thereto.

*Example 1*

Referring to the drawing it is seen that the present system is a closed system of continuously circulating fluid from which solid products are continuously removed but from which no liquid is discarded. The necessary water for the system can be introduced at any suitable point in the system. Thus, in one form of the invention the necessary water may be introduced at vessel V where it is used only once to treat the carnallite rock. Subsequent charges of carnallite rock, however, are treated with the liquor that is formed when the system reaches equilibrium. Thus, subsequent charges of carnallite rock together with the deposited carnallite and NaCl from vessel II are introduced into treating vessel V wherein they are treated with liquor coming from a previous step of the total process and containing below about 16% HCl down to 1% HCl. The carnallite rock a.s.o. is mixed with the mother liquor at a temperature of about 90° C. This mixing and especially the driving off of HCl is aided by a mild stream of air that is injected into vessel V. HCl contained in this liquor is distilled together with an amount of water which corresponds to the prevailing partial pressures in dependence on the continuous dissolution of magnesium chloride from carnallite, and on the temperature, and is condensed in reflux condenser VI. The liquor containing the residue and fine salt-containing mud of carnallite rock, consisting of rock salt, kieserite a.s.o. is conveyed to tank VII where it is stirred once more and the small amount of HCl (at most 1%) is neutralized with limestone or magnesite (dolomite). The undissolved coarser material settles to the bottom of the tank VII and is removed as residue or moved on for further processing to recover kieserite. The hot carnallite solution is then conveyed to clarification tank VIII in a manner known per se where further insoluble materials (mud containing fine salt) are removed. The clarified solution of carnallite is then conveyed, in a conventional manner, to vacuum cooler IX through line 16. Liquor recovered from filter XII after removal of mud is also conveyed to the vacuum cooler through line 13. The carnallite solution with the crystallized product KCl is then carried to settling tank X. Mother liquor from settling tank X (by line 14) and liquor obtained in filtering the crystals in filter XI (by line 15) is conveyed to tank I by means of pump P.

The mother liquor flowing in line 14 is substantially an aqueous solution containing among other things $MgCl_2$, KCl, NaCl, $MgSO_4$. This liquor contains under optimum conditions at 20° C. a little more than 300 g./l. of $MgCl_2$ and about 40 g./l. of KCl.

The mother liquor enters tank I and there it is treated with a small amount of gaseous HCl escaping from vessel II by means of line 20 and the HCl gas carried over from reflux condenser VI through line 21 by means of the air introduced into tank V. This treatment takes place at a temperature of from 20° to 30° C. The air is removed from the system by means of line 22. The concentration of HCl in tank I is maintained at a maximum of about 1%.

The liquor is then conveyed to tank II by means of line 23. The solution is cooled to below 20° C. and treated with HCl gas coming from tank III by way of line 24. Moreover, a little concentrated hydrochloric acid normally overflowing from HCl storage vessel XIII is fed to tank II via line 25. The concentration of HCl is maintained in tank II at more than 12% to about 15%. Under this condition, carnallite and NaCl are separated, whereas $MgSO_4$ remains in solution. The precipitate is continuously removed by line 33 over salt separators, filtered and transferred by line 34 to tank V for retreatment.

The solution from tank II, practically free from alkali chloride, flows into tank III by way of line 26. Hydrogen chloride low in water content is introduced by line 27 from the vapor zone of tank IV after passing through the HCl storage tank XIII. The solution is cooled sharply to room temperature and below, i.e. below 20° C., and the concentration of HCl is maintained at about 20%. As a result of the treatment, technically pure bischofite is precipitated in exactly the same quantity as $MgCl_2$ was introduced with carnallite and is continuously removed by line 28 to salt separators and filters. The liquor remaining behind in tank III still contains about 15% of $MgCl_2$. The magnesium sulfate is still in solution. If the concentration of $MgSO_4$ should increase beyond the saturation point, there would occur a reaction with hydrogen chloride forming magnesium chloride and sulfuric acid, the former separating as bischofite.

The solution from tank III flows to tank IV through line 29. The liquid is heated in tank IV to a temperature of 95° C. and above by circulation preheating. The hydrogen chloride from this tank is distilled in concentrated form (about 95% HCl) through line 27 so that about 16% HCl remain. Any sulfuric acid formed in tank III reacts in tank IV with a part of the residual magnesium chloride present under the conditions prevailing in tank IV, whereby $MgSO_4$ is formed. This together with other $MgSO_4$ that may be present in the system is precipitated as kieserite ($MgSO_4.H_2O$) on reaching the salting-out point, in tank IV and removed through line 30 by a salt separator and a filter. The hot hydrochloric acid solution which is low in HCl content flows from tank IV to tank V through line 31. Here the residual HCl is driven off with the aid of elevated temperature and a mild air stream through line 32 to a reflux condenser VI where it is condensed and stored in HCl storage tank XIII for use in the process. The HCl-concentration in the liquid remaining in tank V decreases to about 1% HCl and is used to treat a new charge of carnallite rock, as well as carnallite and NaCl from step II. The cycle is thus completed and there is no discharge of liquids.

An example of the normally continuously conducted process will show the following flow rates, without consideration of the residue utilization (Example 2) under the condition that Van't Hoff's equilibrium solution (Q 20° C.) is reached for the mother liquor.

The temperatures or the temperature ranges correspond to the ones indicated above and they may be varied, i.e., may be higher or lower when other conditions are varied in the treatment of carnallite rock, as often occurs.

43.0 tons/hour or about 1000 tons/day of crude carnallite (53% $KCl.MgCl_2.6H_2O$, 15% $MgSO_4.H_2O$, 32% NaCl insoluble matter disregarded) are conveyed to treatment step tank V together with 15.4 tons of the chloride mixture salted-out in vessel II (containing 10.5 tons carnallite, 0.7 ton bischofite, 2.7 tons NaCl, 1.5 tons adhering solution). The remaining hydrogen chloride of the solution from step IV escapes with an amount of water vapor (10-40% $H_2O$) corresponding to the partial pressures of the weakly acidic carnallite solution (about 1% HCl, temp. above 95° C. to near boiling point). The water which evaporated and was condensed in reflux condenser VI returns into the process at II by means of the conc. HCl overflowing from HCl storage tank XIII. Formed are: 107.5 tons/hour hot solution (8.3% KCl, 23.6% $MgCl_2$, 1.0% $MgSO_4$, 3.2% NaCl, 62.9% $H_2O$) and 20.8 tons residue (6.4 tons kieserite, 12.3 tons rock salt, 2.1 tons adherent solution).

The hot solution is neutralized with 1.2 tons $MgCO_3$.

The hot carnallite solution yields upon further treatment as described—to make it simpler, water withdrawal in the vacuum cooling step and water return over the crystal-purification step—7.5 tons crystallized matter (6.1 tons KCl, 0.7 ton NaCl, 0.7 ton adherent solution) and 100 tons mother liquor (2.8% KCl, 25.2% $MgCl_2$, 1.0% $MgSO_4$, 2.7% NaCl, 68.3% $H_2O$).

From 100 tons per hour of the mother liquor, 15.4 tons chloride mixture of the above given composition are salted out at temperatures between 20 and 30° C. by means of 15.2 tons hydrogen chloride from the vapor zone of vessel III and, to a small extent, by means of concentrated hydrochloric acid from the HCl storage vessel XIII. The 100 tons intermediate solution remaining in vessel II (15.0% HCl, 21.0% $MgCl_2$, 1.0% $MgSO_4$, 63.0% $H_2O$) pass over to the treatment vessel III. They are further salted out by addition of 2.9 tons HCl (practically anhydrous) from the vapor zone of the HCl storage vessel XIII, at temperatures between 15 and 20° C. The result are 18.5 tons bischofite (16.7 tons $MgCl_2.6H_2O$, 1.8 tons adherent solution). Furthermore, 86.0 tons intermediate solution remaining in vessel III (20.8% HCl, 15.2% $MgCl_2$, 1.0% $MgSO_4$, 63.0% $H_2O$).

84.2 tons per hour of this intermediate solution of the composition as described, are heated in treatment vessel IV by circulation heating to temperatures above 95° C., while at the same time 4.7 tons 95% HCl are driven over to the HCl storage vessel XIII. In vessel IV there remain 80.0 tons intermediate solution (16.0% HCl, 16.1% $MgCl_2$, 0.9% $MgSO_4$, 67.0% $H_2O$). Kieserite does not separate, since the salting-out point for $MgSO_4$ is not yet reached; however, this may occur if the liquor circulation is combined with residue treatment. 80.0 tons per hour of hot intermediate solution, of a composition as described above, are flowing finally to treatment vessel V. There, 43.0 tons/hour carnallite rock (composition as above) are introduced at the temperature of above 90° C., and 15.4 tons/hour of the chloride mixture which was salted out in treatment vessel II. A slight current of air serves for better stirring and for expelling hydrogen chloride during the dissolution of magnesium chloride in the solution, which takes place in a few minutes. During this step, 14.2 tons HCl escape in a condition comparatively rich in water, entering the reflux condenser VI.

Some small discrepancies in the computation of the balance of materials, which in large-scale operation can easily be compensated, result from the natural fluctuations in the composition of the starting materials and in the inconstant equilibrium conditions of the solution and the vapor pressure ratio $H_2O$:HCl varying with the temperature.

Example 2

The residue and the mud from the hot solution are treated in one or more settling vessels XIV equipped with sieve bottoms, once with hydrochloric acid of more than 12% HCl content in codirectional or counter flow. The kieserite dissolves readily, favored by simultaneous hydration, and increasing temperature to 40° C., up to a concentration of more than 25% $MgSO_4$ in solution. The rock salt and other secondary components, anhydrite, clay, etc. are attacked but slightly. Formation of double salts does not take place.

The residue is removed after filtration over line 38. It consists of rock salt in a more or less pure condition. In further charges of kieserite, mother liquor from a subsequent treatment operation XVI is used as solvent which is supplied through line 35 to vessel XIV under cooling. The solution obtained in vessel XIV is passed through line 36 to vessel XV. By supplying hydrogen chloride with low water contents from the vapor space of the collecting vessel of condensation system VI over line 39, a pure very fine-grained kieserite is salted-out with utilization of the considerable amount of heat of condensation, at temperatures above 40° C., which is separated over line 37 in salt separators and filtered. The remaining solution contains at a temperature of 40°-60° C. and a concentration of about 22% HCl, still about 16% $MgSO_4$. This solution is passed over to vessel XVI. By raising the temperature to over 90° C. a larger portion of HCl is distilled off and flows through line 40 into the HCl storage vessel XIII. The remaining solution is passed over 35 under cooling to vessel XIV. The cycle of the movement of liquors and of hydrogen chloride is thereby closed.

20.8 tons/hour of residue (from Example 1, composition as above) are treated at about 40° C. in a countercurrent process with 35.2 tons of cooled diluted magnesium sulfate solution (16.1% HCl, 2.8% $MgCl_2$, 19.0% $MgSO_4$, 62.1% $H_2O$) supplied from the vessel XVI. The results are: 45.6 tons concentrated magnesium sulfate solution (12.5% HCl, 2.4% $MgCl_2$, 28.0% $MgSO_4$, 57.1% $H_2O$), furthermore 14.0 tons impure rock salt (12.4 tons NaCl, 0.2 ton KCl, 1.4 tons adherent solution).

After this solution has been passed to vessel XV, 3.6 tons/hour of HCl poor in water are admitted from the vapor space of the HCl storage vessel XIII. When the salting-out point is reached at temperatures between 50 and 60° C., 7.1 tons kieserite (6.4 tons $MgSO_4.H_2O$, 0.7 ton adherent solution) are salted-out. 40.7 tons diluted magnesium sulfate intermediate solution remain of the following composition: 22.0% HCl, 2.4% $MgCl_2$, 16.5% $MgSO_4$, 59.1% $H_2O$.

From this solution, 5.5 tons hydrogen chloride containing 40% $H_2O$ are expelled by raising the temperature to 90–100° C.

The remaining 35.2 tons magnesium sulfate solution of the above indicated composition, are cooled down to a temperature of 30–40° C. and are used for treating 20.8 tons of fresh residue in a cycle process.

While the invention has been described with particular reference to specific embodiments and examples are given on the quantitative course of the process, it is to be understood that it is not limited thereto, but it is to be construed broadly and restricted solely by the scope of the appended claims.

What is claimed is:

1. A cyclic process for the treatment of a carnallite-bearing material for the recovery of KCl and other mineral salts therefrom without formation of a liquor which must be disposed of, which comprises mixing in a first zone said carnallite-bearing material with a dilute $MgCl_2$-containing HCl solution of about 1% HCl produced in a previous step in the cycle and treating it at a temperature of about 90° C., whereby a solution is produced containing KCl, NaCl, $MgCl_2$, and $MgSO_4$; neutralizing small amounts of HCl in said last-mentioned solution by an equivalent amount of alkaline material, removing from said neutralized solution residual solids and mud; thereafter crystallizing the main amount of KCl by a cooling operation and removing the crystals in pure form from said solution, thus leaving behind a mother liquor containing $MgCl_2$, $MgSO_4$, NaCl and residual KCl; passing said mother liquor to a second zone wherein said liquor is stirred with HCl to a concentration of about 1% HCl in solution at a temperature of about 20–30° C.; precipitating from said mother liquor in a third zone carnallite and NaCl by treatment with approximately 12–15% HCl solution at a temperature of about 20° C., leaving $MgSO_4$ in solution; removing said carnallite and NaCl for retreatment together with new carnallite-bearing material; cooling in a fourth zone said $MgSO_4$-containing solution to a temperature below 20° C. and increasing the HCl content to about 20–30%, thereby precipitating pure $MgCl_2.6H_2O$ and removing the crystals from the solution; heating the last-mentioned solution in a fifth zone to a temperature of about 95° C. and evaporating the HCl content to about 16%, whereby $MgSO_4.H_2O$ is precipitated, removing the same from the solution for recovery and using the solution from the above-defined step-wise separation of salts for treating in said first zone fresh carnallite-bearing material thereby closing the cycle, while recovering KCl, NaCl, $MgCl_2.6H_2O$ and $$MgSO_4.H_2O$$

from the respective zones in said separate operations.

2. A process according to claim 1 including the step of introducing a mild stream of air into the first zone of operations.

3. A process according to claim 2 wherein HCl expelled in the first and fifth zones is condensed and recycled to zones 2, 3 and 4 in the process.

4. A process according to claim 1 including the steps of separating residual solids and mud which contains finely divided salts consisting of kieserite, rock salt and impurities from the hot solution, formed in said first zone, extracting said residue and mud with 12% HCl solution whereby the kieserite dissolves, salting out said kieserite from said solution with concentrated HCl whereby a rest of about 19% unprecipitated $MgSO_4$ is left in solution, conducting this solution to said fourth zone, precipitating bischofite in said fourth zone and distilling HCl contained in the liquid of said zone.

References Cited in the file of this patent
UNITED STATES PATENTS

| | | |
|---|---|---|
| 1,801,661 | Collings | Apr. 21, 1931 |
| 1,836,426 | Allen | Dec. 15, 1931 |
| 2,687,339 | Dancy | Aug. 24, 1954 |